United States Patent Office 3,246,041
Patented Apr. 12, 1966

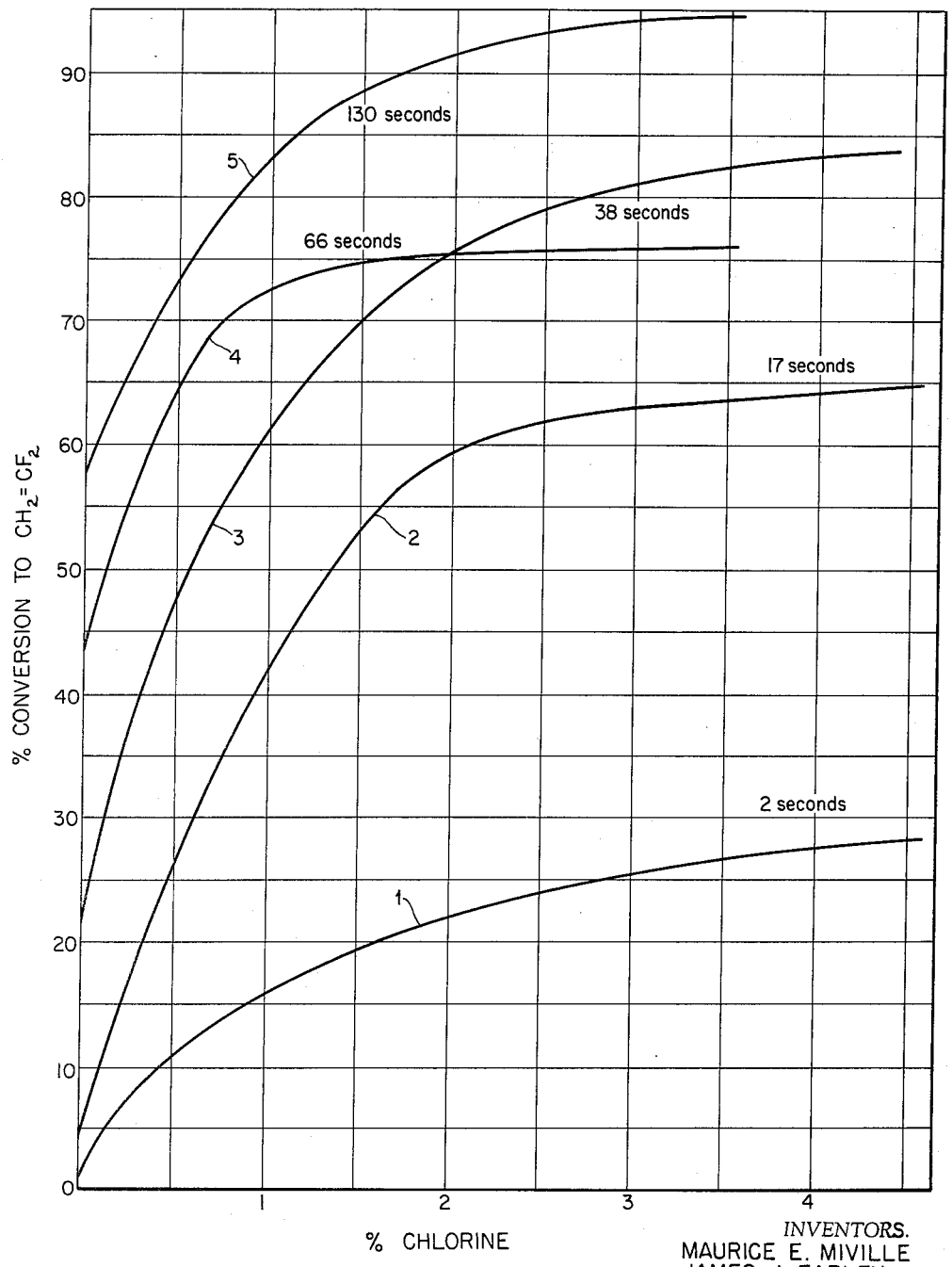

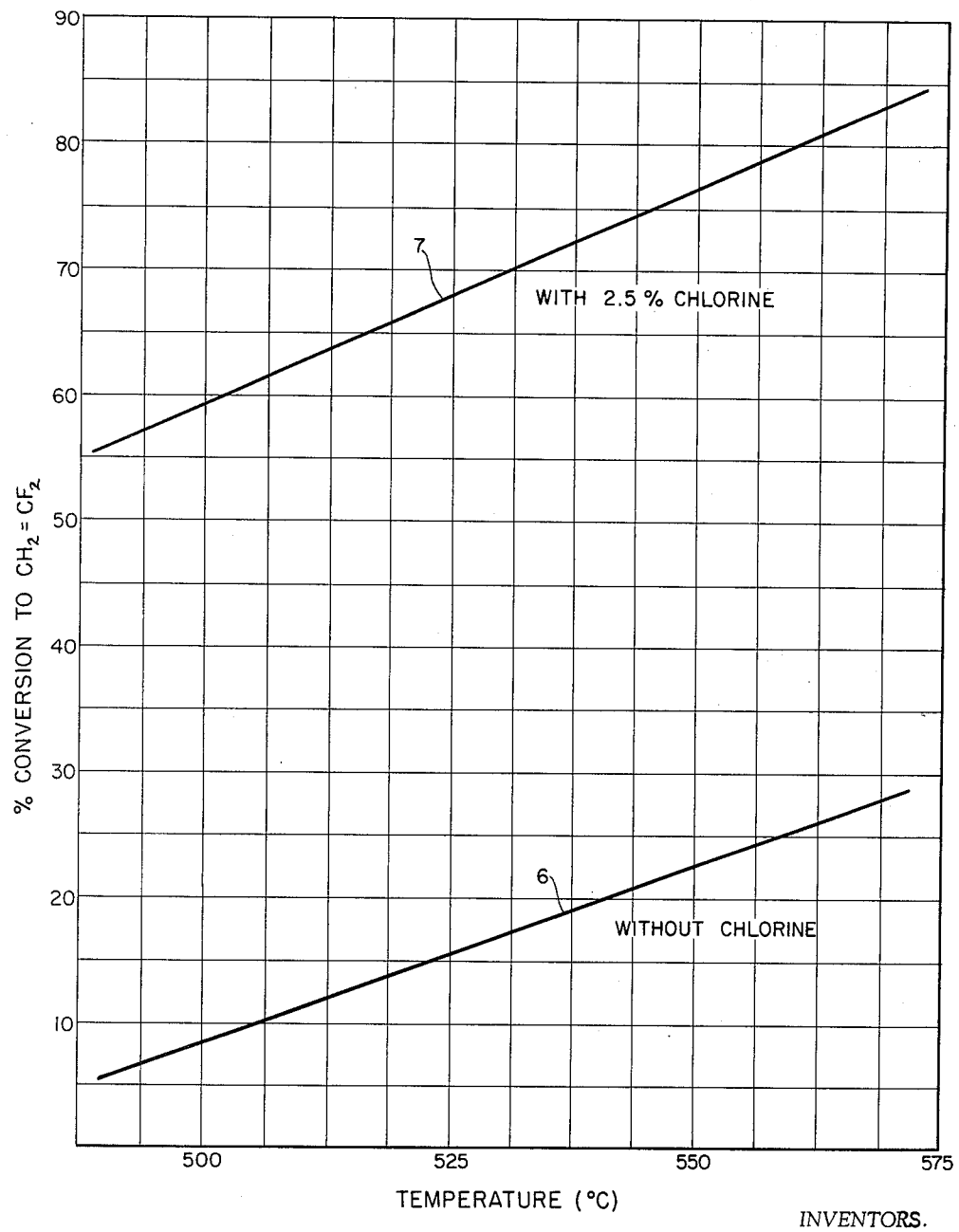

3,246,041
PRODUCTION OF VINYLIDENE FLUORIDE
Maurice Miville, Flourtown, and James J. Earley, Springfield, Pa., assignors to Pennsalt Chemicals Corporation, Philadelphia, Pa., a corporation of Pennsylvania
Filed Mar. 30, 1965, Ser. No. 443,959
6 Claims. (Cl. 260—653.5)

This is a continuation-in-part of application S.N. 143,826, filed October 9, 1961, now abandoned.

This invention relates to the dehydrochlorination of 1,1-fluorochloroethane to produce vinylidene fluoride in high yields and conversions at relatively low temperatures.

The pyrolytic dehydrochlorination of 1,1-difluorochloroethane to produce vinylidene fluoride is well known. Under purely thermal conditions (i.e. in the absence of catalyst) relatively high temperatures of the order of 650° C. and higher are required for good reaction rates giving high conversions per pass through the reactor. At temperature below about 600° C., the reaction rate drops off sharply. Attempts to increase the reaction rate at lower temperatures such as by the use of catalysts, have met with only partial success. Thus, while catalytic materials such as activated carbon or iron, have been found to increase the reaction rate at e.g. temperatures of 500° to 600° C., they generally also promote undesired side reactions particularly the dehydrofluorination of the starting material to give substantial quantities of the by-product $CH_2=CFCl$. The proportion of these by-products increases rapidly when attempts are made to obtain relatively high conversions per pass (e.g. by increasing contact time), making it impossible to obtain the desired combination of high yields and relatively high conversions. For such reasons, despite the many advantages of operating at lower temperatures such as lower heat consumption, less costly materials of construction, fewer corrosion difficulties and the like, there has been as far as we are aware, no commercial production of vinylidene fluoride under such conditions.

In accordance with the present invention, it has now been found that excellent yields and high conversions of vinylidene fluoride may be obtained by the dehydrochlorination of 1,1-difluorochloroethane at relatively low temperatures of from 450° to 625° C. and preferably from 500° to 575° C. when the dehydrochlorination is carried out in the presence of small, controlled amounts of free chlorine ($Cl_2$). This invention also enables the dehydrochlorination of 1,1,1-difluorochloroethane to be carried out at temperatures up to about 800° C. without significant dehydrofluorination and attendant carbonization which usually occurs at such temperatures. As will be illustrated by the examples which follow, the presence of small amounts of free chlorine causes a dramatic increase in the reaction rate resulting in a several fold increase in the conversion per pass without appreciable yield losses through the formation of by-products.

The amount of free chlorine to be employed is quite critical. The weight percent of chlorine, based on the weight of the starting material, 1,1-difluorochloroethane, should range from not less than about 0.5% to not more than about 4%, and should preferably be in the range of from 1% to 3% by weight. As illustrated by the examples which follow, it has been found that when the chlorine concentration is below about ½% by weight, the increase in conversion obtained is not substantial. Chlorine concentrations above about 4% on the other hand do not further substantially increase the conversion, and have the disadvantage of increasing the formation of undesired chlorine containing by-products. Such by-products may be formed by the chlorination in situ of the starting material followed by the dehydrochlorination of the chlorinated product as shown in the following equations:

Equation A

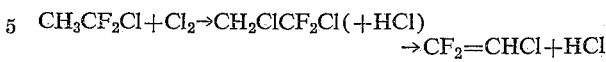
$$\rightarrow CF_2=CHCl+HCl$$

Equation B

$$\rightarrow CF_2=CCl_2+HCl$$

Provided the chlorine concentration is held within the specified limits, the yield losses due to the above reactions are not significant, usually less than about 2%. In the preferred range of chlorine concentration, viz. from about 1 to 3%, there is obtained the optimum combination of high conversions to $CH_2=CF_2$ and the minimum amounts of chlorination by-products.

As stated previously, the invention is carried out with advantage at temperatures of 450° to 800° C. At temperatures of about 450° C. conversions to vinylidene fluoride are on the order of about 20% and for this reason, somewhat higher temperatures will usually be employed. The optimum combination of relatively low temperature operation coupled with high conversions and excellent yields of vinylidene fluoride at practicable contact times is generally obtained in the preferred range of from 525° C to 575° C.

Contact time (i.e. the residence time of the reactants in the heated reaction zone) will vary depending upon reaction temperature, longer contact times producing higher conversions at any given temperature. Contact time is expressed herein in second at standard temperature and pressure (STP), i.e. 0° C. 760 mm. Hg in accordance with the following:

Contact time in seconds=
$$\frac{\text{volume of heated reaction zone}}{\text{volume of gas per second (calculated at STP) fed to the heated zone}}$$

On the above basis, contact times useful in the process of the invention will generally lie in the range of from about one second to one hundred seconds and preferably in the range of from five to fifty seconds. Choice of optimum contact time will of course involve an economic balance between the higher conversions obtained at longer contact time and the smaller reactor volume required at lower contact time.

It is preferred to carry out the pyrolysis reaction by continuously passing the starting material pre-mixed with a small amount of chlorine through a heated zone. Conveniently, the heated zone may be in the form of a hot tube heated to the desired temperature by electrical or other suitable heating means. The tube should be constructed of materials resistant to attack by the reactants or reaction products at the operating temperature, and which do not catalyze the dehydrofluorination of 1,1-difluorochloroethane. Suitable materials in these respects include, for example, platinum, platinum and rhodium alloys, nickel, inconel, and monel. Nickel or nickel lined tubes and inconel tubes are particularly preferred for their relatively low cost and satisfactory performance.

The preferred starting material is 1,1,1-difluorochloroethane, $CH_3CF_2Cl$, although if desired, the isomeric form 1,1-difluoro-2-chloroethane, $CH_2ClCF_2H$ may also be used. 1,1,1,-difluorochloroethane is readily prepared by the fluorination of methyl chloroform or by the addition of hydrogen fluoride to acetylene followed by chlorination and is preferred for its availability and relatively low cost.

EXAMPLES 1 TO 15

The following examples illustrate the effect of chlorine concentration at a constant temperature of 550° C. and at varying contact time. In these runs, the pyrolysis is carried out in nickel tubes having an inside diameter and heated length as shown in Table I. The tubes in each case are heated electrically and the reaction temperature is recorded by thermocouples attached to the outside tube wall. The starting material $CH_3CF_2Cl$ is fed to the heated tube at a rate corresponding to the contact time shown in Table I, while chlorine is metered into the $CH_3CF_2Cl$ stream and pre-mixed therewith upstream from the reactor tube at a rate adjusted to give the weight percent chlorine as shown in Table I. The product stream is scrubbed in water and caustic to remove HCl, HF, and any residual chlorine, dried and collected. The product compositions are determined by feeding samples of the product stream to a gas-liquid partition chromatograph and are shown in Table I.

EXAMPLES 16 TO 21

The following examples are carried out at a constant chlorine concentration of 2.5% and a constant contact time of 36 seconds and at varying temperatures. A nickel tube having an inside diameter of 1 inch and an electrically heated length of 36 inches was used in each case. In Examples 16 to 18, no chlorine was added, while in Examples 19 to 21 at similar temperature, 2.5% by weight of $Cl_2$ based on the starting material $CH_3CF_2Cl$ was pre-mixed with the starting material before passing through the pyrolysis tube. Product compositions were determined as in the previous examples.

The data from these runs is shown in Table II and is plotted graphically in FIGURE 2 of the drawings to which reference is now made. In FIGURE 2, curve 6

*Table I*

| Example | Temperature, °C. | Reactor | | Percent $Cl_2$ by wt. based on $CH_3CF_2Cl$ | Contact, time, seconds STP | Product composition, mole percent | | | | | Mole percent conversion to $CH_2=CF_2$ |
|---|---|---|---|---|---|---|---|---|---|---|---|
| | | I.D., inches | Heated length, inches | | | $CH_2=CF_2$ | $CH_3CF_2Cl$ | $CH_2=CFCl$ | $CF_2=CHCl$ | Other | |
| 1 | 550 | .27 | 12 | 0.0 | 2 | .4 | 99.6 | | | | 0.4 |
| 2 | 550 | .27 | 12 | 0.6 | 2 | 11.4 | 88.6 | | | | 11.4 |
| 3 | 550 | .27 | 12 | 1.7 | 2 | 20.2 | 79.8 | | | | 20.2 |
| 4 | 550 | .27 | 12 | 4.5 | 2 | 28.0 | 72.0 | | Trace | | 28.0 |
| 5 | 550 | .82 | 12 | 0.0 | 17 | 3.6 | 96.4 | | | | 3.6 |
| 6 | 550 | .82 | 12 | 0.6 | 17 | 29.8 | 70.2 | | | | 29.8 |
| 7 | 550 | .82 | 12 | 1.7 | 17 | 55.9 | 43.7 | | 0.4 | | 55.9 |
| 8 | 550 | 1.0 | 12 | 4.5 | 17 | 64.6 | 33.4 | | 2.0 | | 64.6 |
| 9 | 550 | 1.0 | 36 | 0.0 | 38 | 21.4 | 76.2 | 0.3 | 0.0 | [1] 2.1 | 21.4 |
| 10 | 550 | 1.0 | 12 | 2.5 | 38 | 78.1 | 20.1 | 0.1 | 1.2 | [2] 0.5 | 78.1 |
| 11 | 550 | 1.6 | 36 | 0.0 | 66 | 43.4 | 56.2 | 0.4 | | | 43.4 |
| 12 | 550 | 1.6 | 36 | 0.7 | 66 | 71.1 | 28.8 | 0.1 | Trace | | 71.1 |
| 13 | 550 | 1.6 | 36 | 1.5 | 66 | 74.4 | 24.8 | >0.1 | 0.7 | | 74.4 |
| 14 | 550 | 1.6 | 36 | 0.0 | 130 | 57.6 | 41.8 | 0.6 | | | |
| 15 | 550 | 1.6 | 36 | 1.3 | 130 | 87.5 | 11.6 | 0.1 | 0.8 | | 87.5 |

[1] $CH_3CF_3$ impurity in $CH_3CF_2Cl$ starting material.    [2] $CF_2=CCl_2$.

The critical effect of chlorine concentration within the limits of from about ½ to 4% $Cl_2$, on the conversion of starting material to vinylidene fluoride is clearly shown by the data of Table I. For a better understanding of this relationship, reference is now made to FIGURE 1 of the drawings which shows the percent conversion of $CH_3CF_2Cl$ to vinylidene fluoride as a function of chlorine concentration based on the data shown in Examples 1 to 15. Curves 1, 2, 3, 4 and 5 represent respectively the conversions obtained at contact times of 2 seconds, 17 seconds, 38 seconds, 66 seconds and 130 seconds at STP. As is apparent from these curves, as the chlorine concentration increases from 0 to about 4%, the percent conversion increases dramatically, the most rapid increase occurring between about 0 and 2%. After the chlorine concentration has reached about 4%, the rate of increase in conversion has leveled off and no significant further increase in conversion is obtained by the use of higher chlorine concentrations. Thus, additional chlorine results only in yield losses due to undesired chlorination side reactions without corresponding benefit from increased conversion.

shows the results obtained where no chlorine is added to the starting material, while curve 7 shows the dramatically increased conversions that are obtained at similar temperatures with the addition of 2.5% by weight of chlorine.

*Table II*

| Example | Temperature, °C. | Reactor | | Percent $Cl_2$ by wt. based on $CH_3CF_2Cl$ | Contact, time, seconds STP | Product composition, mole percent | | | | | Mole percent conversion to $CH_2=CF_2$ |
|---|---|---|---|---|---|---|---|---|---|---|---|
| | | I.D., inches | Heated length, inches | | | $CH_2=CF_2$ | $CH_3CF_2Cl$ | $CH_2=CFCl$ | $CF_2=CHCl$ | Other | |
| 16 | 500 | 1.0 | 36 | 0.0 | 36 | 7.3 | 92.2 | 0.2 | | [1] 0.3 | 7.3 |
| 17 | 525 | 1.0 | 36 | 0.0 | 36 | 16.2 | 83.3 | 0.2 | | [1] 0.3 | 16.2 |
| 18 | 550 | 1.0 | 36 | 0.0 | 36 | 21.4 | 76.2 | 0.3 | | [2] 2.1 | 21.4 |
| 19 | 500 | 1.0 | 36 | 2.5 | 36 | 59.8 | 37.6 | 0.2 | 2.1 | [3] 0.3 | 59.8 |
| 20 | 525 | 1.0 | 36 | 2.5 | 36 | 66.6 | 31.2 | 0.2 | 1.8 | [3] 0.2 | 66.6 |
| 21 | 550 | 1.0 | 36 | 2.5 | 36 | 78.1 | 20.1 | 0.1 | 1.2 | [3] 0.5 | 78.1 |

[1] $CH_3CHF_2$ impurity in $CH_3CF_2Cl$ starting material.    [2] $CH_3CF_3$ impurity in $CH_3CF_2Cl$ starting material.    [3] $CF_2=CCl_2$.

As shown by the foregoing examples, excellent yields of vinylidene fluoride are obtained, the yield losses due to the production of chlorinated by-products being generally less than about 2%. It may be noted also that the production of vinylidene fluorochloride, $CH_2=CFCl$ (produced by dehydrofluorination of the starting material), is negligible. Indeed, the presence of the free chlorine appears to have a suppressing effect upon the production of this by-product. For instance, compare Examples 18 and 21 run under identical conditions except for the presence of 2.5% chlorine in Example 21. In Example 18, without chlorine, 0.3% $CH=CFCl$ was obtained at a 21.4% conversion, representing a 1.4% yield loss. In Example 21 on the other hand, with 2.5% chlorine, only 0.1% $CH_2=CFCl$ was obtained at a conversion of 78.1%, representing only a 0.1% yield loss.

In view of the suppression of dehydrofluorination of the starting material by the presence of chlorine, the process may be operated at higher temperatures without the adverse effects normally obtained. When dehydrofluorination of the 1,1,1-difluorochloroethane occurs it need not stop with the formation of CH$_2$=CFCl, but further dehydrofluorination can occur to form the unstable acetylenic compound which decomposes to carbon and HCl. This carbonization is quite undesirable because it may plug the reactor tubes and affect operability of the process. However, by use of chlorine in accord with this invention, temperatures up to about 800° C. in conjunction with low contact time may be used without significant dehydrofluorination and carbonization occurring. Operation of the process at the higher temperatures and low contact time (i.e. higher thruput) is desirable because it permits a very efficient process to be achieved.

The following example illustrates the favorable operation of the process at the higher temperature.

EXAMPLE 22

Using a reactor having an inside diameter of 2.0 inches heated for a length of 8′2″, a mixture of 1,1,1-difluorochloroethane and 1.8% chlorine was fed in at 140 lbs./hr. and was pyrolyzed at 649° C. at a contact time (STP) of 1.4 seconds. The percent conversion of vinylidene fluoride was 48.1%.

When operated without chlorine being present under the above conditions the conversion to vinylidene fluoride is on the order of about 10%.

EXAMPLE 23

Using a 12″ length of ⅛″ nickel pipe having an inside diameter of 0.68 cm. as a reactor (tube volume 11.3 cc.) 1,1,1-difluorochloroethane was fed in at a rate of 300 g./hr. and at 800° C. for a contact time of 0.15 sec. whereby 25.7 mole percent of vinylidene fluoride was formed.

When the reaction was repeated using 1.5% chlorine admixed with the 1,1,1-difluorochloroethane, the product was obtained at 54.3% conversion.

We claim:
1. A method for producing vinylidene fluoride by the dehydrochlorination of 1,1,1-difluorochloroethane which comprises the step of passing a stream of said fluorochloroethane containing from about 0.5% to 4% by weight of free chlorine through a zone heated to a temperature of from 450° to 800° C.

2. A method in accordance with claim 1 in which said stream contains from 1 to 3% by weight free chlorine.

3. A method in accordance with claim 1 in which said zone is heated to a temperature of from 525 to 575° C.

4. A method for producing vinylidene fluoride by the dehydrochlorination of 1,1,1-difluorochloroethane which comprises the step of passing a stream of said fluorochloroethane containing from about 1 to 3% by weight of free chlorine through a zone heated to a temperature of from 525° C. to 575° C.

5. A method for producing vinylidene fluoride by the dehydrochlorination of 1,1,1-difluorochloroethane which comprises the step of passing a stream of said fluorochloroethane containing from about 0.5 to 4% by weight of free chlorine through a tube heated to a temperature of from 450° C. to 800° C. at a contact time of from about 5 to 50 seconds.

6. A method for producing vinylidene fluoride by the dehydrochlorination of 1,1,1-difluorochloroethane which comprises the step of passing a stream of said fluorochloroethane containing from about 1 to 3% by weight of free chlorine through a tube heated to a temperature of from 525° to 575° C. at a contact time of from about 5 to 50 seconds.

References Cited by the Examiner

UNITED STATES PATENTS

| | | | |
|---|---|---|---|
| 2,378,859 | 6/1945 | Mugdan et al. | 260—656 |
| 2,566,807 | 9/1951 | Padbury et al. | 260—653.5 |
| 2,627,529 | 2/1953 | Feasley et al. | 260—653.5 |

DANIEL D. HORWITZ, *Examiner.*

LEON ZITVER, *Primary Examiner.*